US005330163A

United States Patent [19]

[11] Patent Number: 5,330,163

[45] Date of Patent: Jul. 19, 1994

Bodin et al.

[54] LIMIT RINGS FOR RESILIENT SUPPORTS AND METHODS OF MANUFACTURE THEREFOR

[75] Inventors: Francois Bodin, Fontaine; Pierre Georget, Chambray Les Tours, both of France

[73] Assignee: Hutchinson, France

[21] Appl. No.: 744,903

[22] Filed: Aug. 14, 1991

[30] Foreign Application Priority Data

Jun. 11, 1991 [FR] France ............................... 91 07079

[51] Int. Cl.[5] ............................................... F16M 7/00

[52] U.S. Cl. ............................... 267/140.13; 267/141

[58] Field of Search ................ 24/17 AP, 129 D, 300; 267/152, 153, 140.1 C, 140.1 A; 428/231, 232, 295, 109

[56] References Cited

U.S. PATENT DOCUMENTS

| | | | |
|---|---|---|---|
| 1,683,331 | 9/1928 | Chilton | 267/30 |
| 1,703,296 | 2/1929 | Chase | 267/30 |
| 2,879,986 | 5/1958 | Maier | 267/152 |
| 3,080,159 | 5/1960 | Orner | 267/152 |
| 3,892,398 | 7/1975 | Marsh | 267/153 |
| 4,127,039 | 11/1978 | Hollaway, Jr. | 428/295 |
| 4,216,856 | 8/1980 | Moving et al. | 428/295 |
| 4,278,726 | 7/1981 | Wieme | 267/152 |
| 4,588,173 | 5/1986 | Gold et al. | 267/140.1 A |
| 4,770,490 | 9/1988 | Grueneweld et al. | 428/295 |
| 4,834,350 | 5/1989 | de Fontenay | 267/140.1 A |
| 4,942,075 | 7/1990 | Härtel et al. | 267/153 |
| 5,100,490 | 3/1992 | Holroyd et al. | 428/295 |

FOREIGN PATENT DOCUMENTS

| | | |
|---|---|---|
| 0101235 | 2/1986 | European Pat. Off. . |
| 0213043 | 3/1987 | European Pat. Off. . |
| 0213089 | 3/1987 | European Pat. Off. . |
| 0418717 | 3/1991 | European Pat. Off. . |
| 8714888 | 3/1988 | Fed. Rep. of Germany . |
| 2451511 | 10/1980 | France . |
| 2111167 | 6/1983 | United Kingdom . |

*Primary Examiner*—Robert J. Oberleitner
*Assistant Examiner*—Chris Schwartz
*Attorney, Agent, or Firm*—Larson and Taylor

[57] ABSTRACT

A ring for fitting to a resilient support containing two metal cores interconnected by a piece of elastomer, the ring serving to limit the extent to which the cores can be moved apart accidentally. The ring is rectangular in section and is made up of a succession of alternating layers respectively constituted by tapes of elastically deformable material and by sheets of parallel threads that are strong in traction.

6 Claims, 1 Drawing Sheet

4
6
14
2
5
7
7
3
15
1
6

4
6
14
2
5
7
7
3
15
1
6

1
F
F
13
12
11
10
16

LIMIT RINGS FOR RESILIENT SUPPORTS AND METHODS OF MANUFACTURE THEREFOR

The invention relates to rings for fitting to resilient supports or mounts comprising two metal cores interconnected by a piece of elastomer, said rings having the purpose of limiting the extent to which the two cores can be moved apart accidentally, thereby preventing the support in question from being destroyed by being torn apart.

BACKGROUND OF THE INVENTION

Such rings should not give rise to sudden reactions in the event of the support to which they are fitted being caused to deform exceptionally.

On the contrary, the traction limit that they provide must be applied very progressively.

In one advantageous way that has been proposed for manufacturing such rings, a rubber sheath is molded around a ring made up of strong threads, particularly threads made of rayon, Kevlar or carbon (see French patent No. 2 586 278).

A particular object of the invention is to make rings of the kind in question that are simultaneously stronger in traction, easier to manufacture, and cheaper.

SUMMARY OF THE INVENTION

To this end, a manufacturing technique is used which is of the same kind as that used for manufacturing transmission belts for transferring rotary motion over a distance, which belts are generally much longer than the rings of the present invention.

More particularly, according to the invention, limit rings of the kind in question include the improvement whereby they are rectangular in section and are made up of a succession of alternating layers respectively constituted by tapes of elastically deformable material, in particular elastomer, and by sheets of parallel threads that are strong in traction.

As for the method of manufacturing limit rings of the kind in question, it includes the improvement, according to the invention, whereby it comprises the following sequence of steps: a plurality of layers are wound in succession around a hard cylindrical mandrel, the layers being alternatively constituted by a sheet of elastically deformable material, in particular elastomer, and a sheet of parallel threads that are strong in traction and that are placed side by side in the axial direction of the mandrel, the various layers then being assembled together, in particular by vulcanization; and the composite roll formed in this way is then cut up into slices which constitute the desired limit rings.

In addition to the above main dispositions, the invention includes various other dispositions which are preferably used simultaneously therewith and which are explained in greater detail below.

BRIEF DESCRIPTION OF THE DRAWING

A preferred embodiment of the invention is described below in non-limiting manner and with reference to the accompanying drawing, in which.

DETAILED DESCRIPTION

Figure 1:
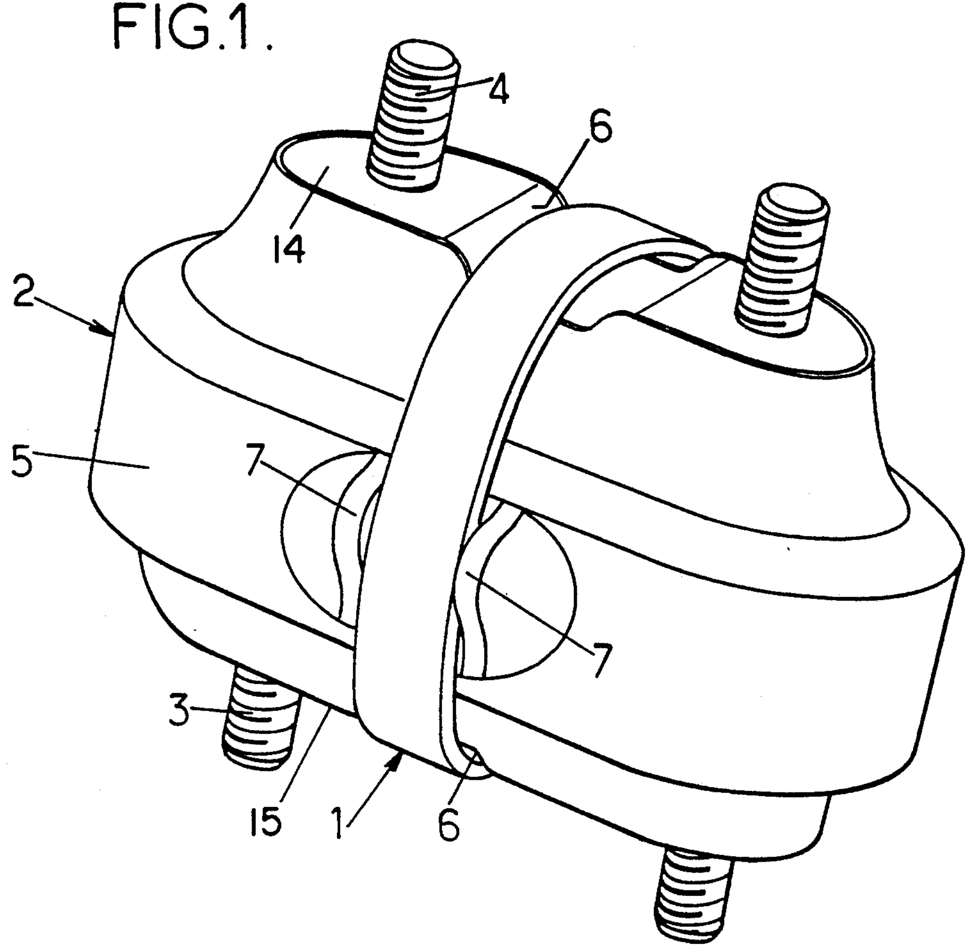
FIG. 1 is a perspective view of a resilient support for the internal combustion engine of a vehicle, the support being fitted with a limit ring of the invention.

The limit ring 1 in question as shown in FIG. 1 surrounds an anti-vibration hydraulic support given an overall reference 2 and designed to be interposed between a vehicle chassis and the internal combustion engine of the vehicle, for support and shock-absorbing purposes.

The support comprises:

a bottom metal core 13 having two bolts 3 projecting downwards and suitable for receiving nuts;

a top metal core 14 having two bolts 4 projecting upwards and suitable for receiving nuts; and a generally cylindrical wall 5 of elastomer interconnecting the two above-mentioned cores and delimiting together therewith a hydraulic chamber which is associated in any conventional and suitable manner with throttle means for obtaining the desired shock-absorbing effect.

The outside face of the support 2 has notches 6 and projections 7 for holding the ring 1 in place around the support.

The ring is rectangular in section and is made up of a succession of superposed turns or layers respectively constituted by tape 11 made of deformable material and by a sheet 12 of parallel threads juxtaposed side-by-side in the direction of the axis of the ring.

The different superposed sheets are substantially cylindrical, being jointedly wound on each other in a spiral, preferably from a same double sheet in a manner which is described in greater detail below.

The tape 11 is preferably made of an elastomer material.

The threads 12 have excellent traction strength.

The threads are preferably made of polyester, however they could also be made of metal or an alloy such as brass-plated steel, of regenerated cellulose (rayon), of glass, of carbon, of an aramid such as that sold by du Pont de Nemours under the name Kevlar (i.e. a poly(1,4-phenylene)terephtalamide) or as sold by Akzo under the name Twaron, or one of the synthetic materials known under the names Kuralon (polyvinyl alcohol, sold by Kuraray) and Hyten (sold by du Pont de Nemours), etc.

The inside and outside faces of the ring 1 are each constituted by a continuous layer of tape 11.

The total number of layers superposed on the first generally lies in the range of 2 to 10 layers.

The total radial thickness of the ring generally lies in the range 2 mm to 6 mm and its axial width is greater than said thickness, lying in the range 5 mm to 15 mm.

The diameter of each thread generally lies in the range 0.3 mm to 3 mm.

To manufacture such a limit ring, it is advantageous to proceed as follows.

Figure 2:
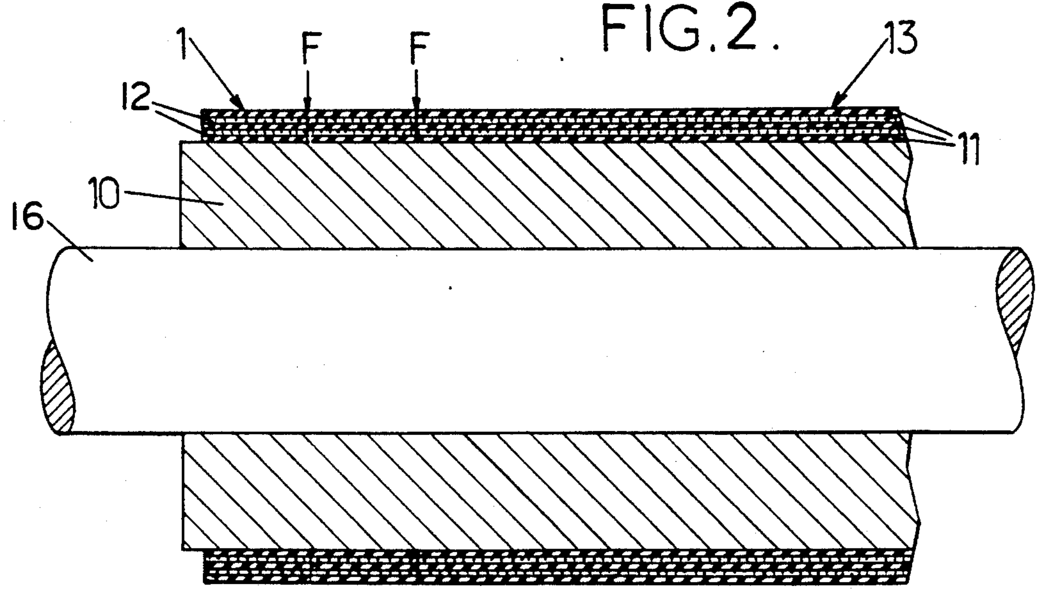
FIG. 2 is an axial section through a mandrel used in accordance with the invention for manufacturing such a limit ring, together with the layers applied to the mandrel.

The following are wound in succession on a common rigid sleeve 10 which surrounds mandrel 16 (FIG. 2): a wide tape 11 of deformable material; and a wide sheet 12 of parallel threads so as to constitute a roll of superposed touching turns.

These various turns are then assembled together so as to form a semi-rigid roll 13.

The parts are assembled together in particular by vulcanizing the assembly if the tape 11 of deformable material is made of rubber, or else by placing an appropriate glue between the various turns while they are being wound, and allowing the glue to set.

Thereafter, the roller 13 formed in this way is sliced on arrows F either before or after being removed axially from the rigid sleeve 10, thereby forming loops or slices that constitute the desired limit rings 1.

As a result, and whatever the method of manufacture used, limit rings are made available whose structure and method of manufacture can be understood sufficiently from the above description.

These limit rings have numerous advantages over those known until now, and in particular they have the following advantages:

because of the gridded distribution and thus high density of component threads, they have excellent traction strength;

moreover, the traction is not progressively reduced as alternating layers are successively added, since the distribution of the non-deformable material in superposed layers actually causes the total mass of the material to work in compression; and the rings in question can be manufactured particularly inexpensively, in particular since the method does not require them to be molded individually.

Naturally, and as can be seen from the above, the invention is not limited in any way to the application and the implementations described specifically above, on the contrary, the invention covers numerous variants.

We claim:

1. An anti vibration hydraulic support for interposition with a vehicle chassis and an internal combustion engine, said support comprising a top metal core having two bolts, a bottom metal core having two bolts, a cylindrical wall of elastomer circumferentially surrounding and interconnecting said top and bottom metal cores, a supporting ring surrounding said metal cores in a direction transverse to said wall of elastomer, said supporting ring comprises of alternating layers of a tape of an elastically deformable material and sheet of parallel threads.

2. The ring according to claim 1 wherein said elastically deformable material comprises rubber.

3. The ring according to claim 1 wherein a width of said ring is 5–15 millimeters.

4. The ring according to claim 1 wherein a thickness of said ring is 2–6 millimeters.

5. The ring according to claim 1 wherein said alternating layers comprise 3–11 layers, inner and outer layers of said ring comprising said tape of elastically deformable material.

6. The ring according to claim 1 wherein said rings have a diameter of 0.3 to 3 mm.

* * * * *

UNITED STATES PATENT AND TRADEMARK OFFICE
CERTIFICATE OF CORRECTION

PATENT NO. : 5,330,163
DATED : July 19, 1994
INVENTOR(S) : BODIN, et al

It is certified that error appears in the above—identified patent and that said Letters Patent is hereby corrected as shown below:

In claim 1, at column 4, line 12, "comprises" should be --comprised--.

Signed and Sealed this

Eighteenth Day of October, 1994

Attest:

BRUCE LEHMAN

*Attesting Officer* *Commissioner of Patents and Trademarks*